May 28, 1935.  F. C. FISHER  2,002,979
CLUTCH
Filed Feb. 16, 1931
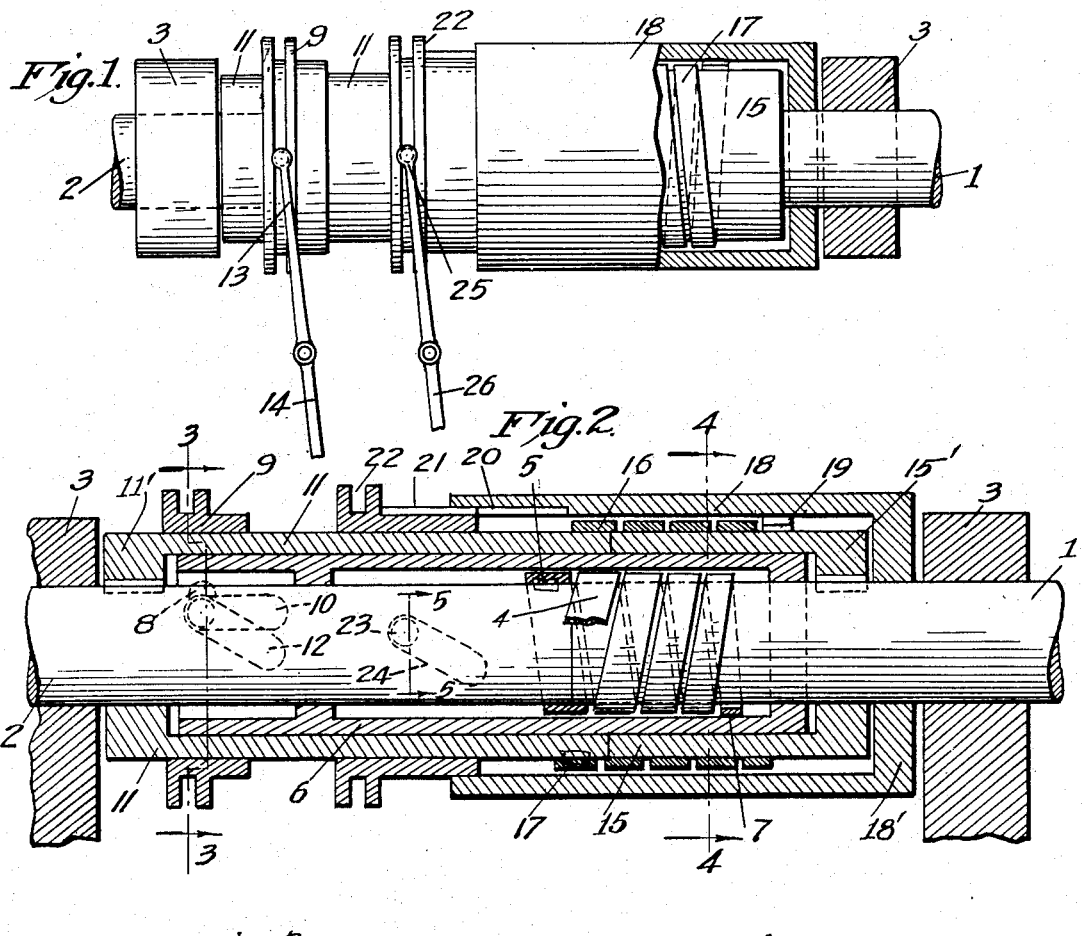
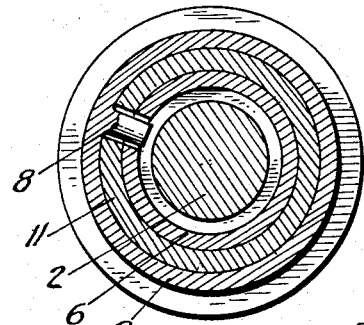
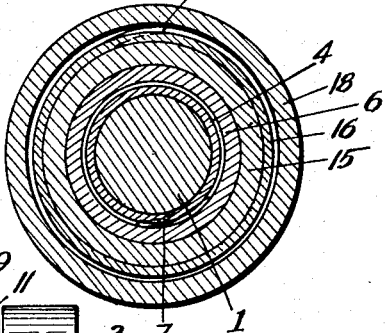
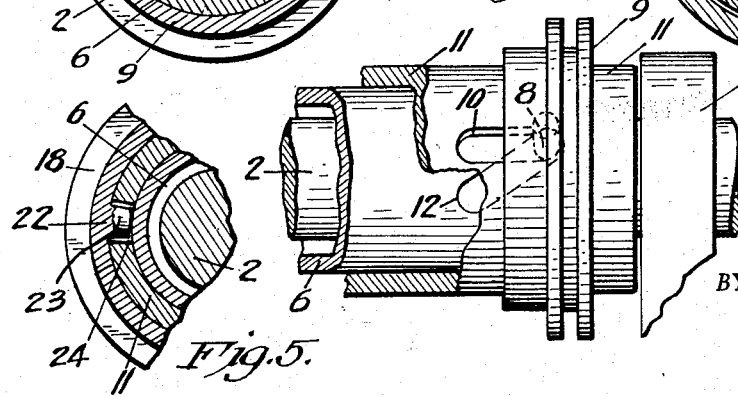
INVENTOR.
Franklin C. Fisher
BY
ATTORNEYS.

Patented May 28, 1935

2,002,979

UNITED STATES PATENT OFFICE 2,002,979

CLUTCH

Franklin C. Fisher, Los Angeles, Calif., assignor, by direct and mesne assignments, of twenty per cent to Alfred W. Knight, San Marino, Calif., twenty per cent to Washington R. Freeman, Los Angeles, Calif., 20 per cent to Louis B. Girard, Los Angeles, Calif., and twenty per cent to J. Royden Estey, South Pasadena, Calif.

Application February 16, 1931, Serial No. 515,906

5 Claims. (Cl. 192—48)

This invention relates to clutch mechanism for controlling operative connection between two shafts or other rotatable members, and particularly to a clutch mechanism provided with means whereby operative connection between the two rotatable members may be either established or released for rotation in either one or the other direction or in both directions.

A particular object of this invention is to provide a clutch device which may be so operated as to maintain a positive frictional operative connection between the two rotatable members during one direction of rotation thereof and to automatically release such operative connection upon relative rotation of one of said members in the other direction.

A further object of the invention is to provide a clutch device which may be operated so as to selectively provide positive frictional operative connection between the two rotatable members in either direction and automatic release in the other direction, or to provide for positive frictional operative connection in both directions, or to provide for release in both directions.

A further object of the invention is to provide a clutch device of this type which is of simple and rugged construction and in which the wear on the parts is reduced to a minimum.

Another object of the invention is to provide a clutch device which is extremely silent in operation both when it is functioning to establish operative connection between the two rotatable members and when it is in released position so as to permit rotation of one of said members without affecting the other member.

A further object of the invention is to provide a clutch device capable of immediate positive frictional engagement without permitting any lost motion between the driving and driven members after the speed of rotation of the driving member has reached that of the driven.

The clutch device of this invention may be applied to any one of a considerable number of different uses. For example, it may be utilized to provide in effect a ratchet connection between two rotatable parts of a machine or tool, for example, a ratchet brace or screw driver.

It should be particularly pointed out that the establishment or release of operative connection of this invention depends not upon the absolute direction and speed of rotation, but rather upon the relative directions and speeds of rotation of the two rotatable members. Thus, if one of the rotatable members be considered as the driving member and the other as the driven member, if the device is adjusted to maintain operative connection therebetween for one direction of rotation of the driving member relative to the driven member and to release such operative connection upon relative rotation of the driving member in the reverse direction, the operative connection will be released not only when the driving member is rotated in said reverse direction while the driven member is at rest, but also when the driven member itself possesses a higher speed of rotation in the first named direction than does the driving member. By reason of these circumstances, the clutch device of this invention is peculiarly adapted for adaptation to the driving means of an automobile or other motor driven vehicle, for the purpose of permitting so-called "free wheeling", that is to say, free rolling of the wheels and operation of the mechanism directly connected thereto without causing the motor to operate at a corresponding speed, whenever the vehicle is traveling at the desired velocity without requiring delivery of power thereto from the motor, as for example when traveling down hill under the action of gravity. The advantages of this sort of a clutch device in an automobile or other motor driven vehicle are obvious and need not be discussed in detail here, but this possible application is merely mentioned in order to illustrate one particularly useful prospective field of application of this invention.

The clutch device of this invention comprises essentially two coaxial rotatable members and a helical spring comprising a plurality of turns secured adjacent one end to one of said rotatable members and having its other end free, and having a plurality of its turns disposed in proximity to a substantially cylindrical bearing surface on the other member and biased by its own resilience toward a position to bring said turns into light frictional engagement with said bearing surface. When the end portions of the helical spring are rotated relatively in one direction, the turns thereof tend to expand or increase in diameter, while relative rotation of said end portions in the reverse direction causes the turns to tend to contract or decrease in diameter, and it is evident that in a construction such as above described, relative rotation of the rotatable members in one direction will cause the helical spring to be moved and held, by frictional engagement with said bearing surface, in position of extremely tight engagement with said bearing surface, while relative rotation of said members in the reverse direction will cause said helical spring to be moved, by its light frictional engagement with said bearing surface, into position in which it is substantially released or freed from such engagement, with only sufficient drag to maintain it in this position against the resilient force of the spring.

The bearing surface which frictionally engages the helical spring should be a true surface of revolution and is preferably cylindrical or substantially so, although it is to be understood that such surface may depart slightly from a true cylinder in an axial direction, for example it may be slightly tapered, without departing from the spirit of this invention. The term "cylindrical" as used herein is therefore intended to include any such slight departure from a true cylinder in an axial direction.

The helical spring may extend either around or within the cylindrical bearing surface on one of the rotatable members. In case said spring extends around said bearing surface with the inner face of the turns of the spring tending toward frictional engagement with said bearing surface, relative rotation of the two rotatable members in such direction as to cause contraction of the spring will serve to establish and maintain an effective operative connection therebetween while relative rotation in such direction as to expand the turns of said spring will serve to release the operative connection between the rotatable members. On the other hand, when the helical spring extends within said bearing surface, with the outer faces of the turns thereof in position to frictionally engage said bearing surface, the conditions are reversed, and operative connection will be maintained when the members are relatively rotated in such direction as to expand the spring and will be released when they are rotated in such relative directions as to contact said spring.

The clutch device also preferably comprises means for positively rotating the free end portion of said spring relatively to the other end thereof in such direction as to release the same from frictional engagement with said bearing surface, so as to permit free relative rotation of the rotatable members in either direction without affecting one another.

The helical spring is preferably of gradually decreasing cross-section from the end which is secured to one of the rotatable members toward the free end thereof, such decrease in cross-section being preferably obtained by tapering or decreasing the width of the successive turns of the spring in a direction parallel to the axis thereof, and serving to improve the effectiveness of operation of the spring under working conditions as hereinafter described.

According to one particular embodiment of this invention, which I have shown herein as a preferred form thereof, by reason of its particular applicability to automobiles or the like for permitting "free wheeling" as above described, the clutch mechanism comprises two helical springs mounted as above described and wound in reverse directions, so that one of said springs serves to maintain operative connection upon relative rotation of the members in one direction and to release operative connection upon relative rotation in the other direction, while the other spring serves to maintain operative connection upon relative rotation in said last named direction and to release operative connection upon relative rotation in the first named direction. With such a construction it is evident that, when both of the helical springs are adjusted to frictionally engage the corresponding bearing surfaces, positive operative connection will be provided between the two rotatable members in both directions of rotation, while by adjusting one or the other of said springs so as to positively release the same from frictional engagement with the corresponding bearing surface, the clutch mechanism will be caused to maintain operative connection in only a certain direction of relative rotation and to release engagement between the members upon relative rotation in the reverse direction, and by so adjusting both of said springs the engagement between the rotatable members may be entirely released so as to permit free relative rotation thereof in either direction without affecting one another.

The accompanying drawing illustrates an embodiment of my invention, and referring thereto:

Fig. 1 is a partly sectional side elevation of a form of clutch mechanism according to this invention provided with two oppositely wound helical springs, so as to provide for maintaining or releasing of operative engagement in either direction or in both directions.

Fig. 2 is a longitudinal section of the clutch device shown in Fig. 1.

Fig. 3 is a transverse section on line 3—3 in Fig. 2.

Fig. 4 is a transverse section on line 4—4 in Fig. 2.

Fig. 5 is a partial transverse section on line 5—5 in Fig. 2.

Fig. 6 is a side elevation, partly broken away, of a portion of the device shown in Fig. 1, taken from the reverse side thereof.

The form of clutch device shown in Figs. 1 to 6 inclusive comprises two shafts or elements 1 and 2, said shafts being arranged coaxially and each shaft being shown as provided with supporting means such as bearings 3 to maintain alignment thereof. Shaft 1 is inserted within, and in light frictional engagement with, a helical spring 4 which is attached at one end 5 by suitable means, for example by welding, to shaft 2, and whose other end 7 is free from direct engagement with either of said shafts but is secured, for example by welding, to a releasing member such as sleeve 6. Said releasing sleeve 6 is freely rotatable on shaft 1 and is operatively interconnected with shaft 2 by means of a pin 8 fixed to a control collar 9, said pin extending through a straight slot 10 in a sleeve 11 keyed to shaft 2, and engaging in an inclined slot 12 in releasing sleeve 6, so that said releasing sleeve 6 is rotatable in relation to shaft 2 upon longitudinal movement of control collar 9 on sleeve 11, due to the cam action of pin 8 on the relatively inclined slots 10 and 12, and to the fact that sleeve 6 is substantially restrained from longitudinal movement as hereinafter explained. Said control collar 9 slides on sleeve 11 and is provided with a grooved portion engaged by fork 13 of a shifting lever 14.

A sleeve 15 is keyed to shaft 1 and inserted in light frictional engagement within a helical spring 16 in a manner similar to the insertion of shaft 1 within spring 4, spring 16 being wound in a direction opposite to that of spring 4. Said spring 16 is attached at one end 17 by suitable means, such as welding, to sleeve 11 which rotates with shaft 2, while the other end 19 of said spring is free from engagement with either of the sleeves 11 and 15 but attached by suitable means, such as welding, to a releasing member such as sleeve 18.

In this embodiment of the invention the helical springs 4 and 16 are shown as being of gradually tapered or decreasing width in an axial direction from the end where they are attached to the rotatable elements 2 and 11 respectively toward the free end portions which are disposed in light frictional engagement with the rotatable elements 1 and 15 respectively.

Releasing sleeve 18 rides free on shaft 1 and is operatively interconnected with sleeve 11 through keyway 20 in releasing sleeve 18 engaging on spline 21 on a control collar 22, said control collar having attached thereto a pin 23 engaging in an inclined slot 24 in sleeve 11. Sleeve 18 is, therefore, rotatable in relation to sleeve 11 upon longitudinal movement of control collar 22 on sleeve 11, due to the cam action of pin 23 in the inclined slot 24, and to the fact that sleeve 18 is substantially restrained from longitudinal movement as hereinafter explained. Control collar 22 is provided with a grooved portion engaged by fork 25 of shifting lever 26.

Assuming control collars 9 and 22 to be in the positions shown, longitudinal movement of control collar 9 to the right in Fig. 2 produces a rotation of releasing sleeve 6 in relation to shaft 2 in such direction as to produce an enlargement in the diameter of spring 4 by twisting of said spring due to the rotation of spring end 7 in relation to spring end 5 attached to shaft 2, thereby releasing spring 4 from frictional engagement with shaft 1. It will be observed that, in order for sleeve 6 to be rotated upon longitudinal movement of control collar 9, as above described, said sleeve must itself be substantially held against longitudinal movement, for example by the hub portions 11' and 15' of sleeves 11 and 15 as shown in Fig. 2, although a certain amount of clearance may be provided at the ends of said sleeve 6, as shown in said figure, in order to provide smooth operation and prevent binding. Longitudinal movement of control collar 22 to the right in Fig. 2 produces a rotation of releasing sleeve 18 in relation to sleeve 11 in such direction as to produce an enlargement in the diameter of spring 16 by the twisting of said spring due to the rotation of spring end 19 by releasing sleeve 18 in relation to spring end 17 fixed to sleeve 11, thereby releasing spring 16 from frictional engagement with sleeve 15. In order to produce this rotative movement, sleeve 18 must also be substantially held against longitudinal movement; for example by engagement of the hub portion 18' of said sleeve between hub portion 15' and fixed bearing 3, although in this case also a limited amount of clearance may be provided, as shown in Fig. 2.

The form of clutch device shown in Figs. 1 to 6 may be operated with either shaft playing the part of driving member. For purposes of illustration, shaft 1 may be considered as driving member. Assuming releasing sleeve 6 to be in the position shown and releasing sleeve 18 being in shifted position so as to release the frictional engagement of spring 16 upon sleeve 15, and assuming shaft 2 to be propelling some form of mechanism possessing inertia, shaft 1 upon being rotated by suitable driving means in a direction opposite to the direction of winding of helical spring 4 exerts a slight frictional drag on said spring 4 near end 7 causing end 7 to creep slightly in the direction of rotation of shaft 1 producing a tightening of spring 4 due to the decrease in diameter of said spring by said creeping on said shaft with consequent increase of frictional engagement therebetween, said increased frictional engagement being progressively communicated throughout the entire length of spring 4 until all play and resiliency in said spring is taken up, whereupon shaft 1 becomes in positive frictional engagement with shaft 2 through spring 4.

The amount of rotation of shaft 1 before being completely held in frictional engagement by spring 4 is governed by the degree of accuracy with which said spring is fitted to said shaft and by the length and resiliency of said spring. Under optimum conditions there is no perceptible movement of shaft 1 ahead of shaft 2 during the clutching process, although an extremely smooth gripping action is obtained. Upon the relative rotation of shaft 1 in a direction opposite to that established in shaft 2, such as would occur if the driven shaft 2 should tend to rotate faster than the driving shaft 1, the frictional drag on spring 4 is reversed, which action is productive of a slight rotation of spring 4 in the direction of relative rotation of shaft 1, producing an enlargement of the diameter of spring 4 with consequent decrease of frictional engagement of said spring with said shaft 1, resulting in a substantially free release of said shaft 1 by said spring, and allowing shaft 2 to rotate independent of shaft 1, or allowing shaft 1 to rotate in a reverse direction to that above assumed independent of shaft 2. Upon a second reversal of the direction of relative rotation of shaft 1, as for example in case of an acceleration of shaft 1 to the speed of rotation of shaft 2, the slight frictional drag of shaft 1 on spring 4 by which said spring was held in non-gripping position will be immediately released, allowing said spring to reassume an unstrained condition; further acceleration of shaft 1 causing positive frictional engagement of spring 4 with subsequent operation of shaft 2.

The tapering or decreasing of the width of springs 4 and 16 decreases the cross-section and consequently the strength of the successive turns. Inasmuch as the transmission of torque or power between the respective rotatable parts engaged by said springs is distributed between the several turns of the spring when in power transmitting position, it is evident that the load on each of the springs increases from the free end toward the attached end thereof, and the formation of the springs as above described therefore proportions the strength of the spring in accordance with the load to be transmitted thereby. Furthermore, the relatively small cross-section and consequently lighter strength of the outer turns of the respective springs imparts a relatively high flexibility to the free end portions thereof and thus makes these portions quite sensitive or susceptible to relative rotation in one direction or the other by light frictional engagement with the respective parts engaged thereby, so that the springs respond smoothly and instantaneously to sudden changes in operating conditions and at the same time possess sufficient strength to prevent breaking or deformation thereof under the severest and most sudden strains imposed thereon.

Lateral movement of control collar 9 to the right will occasion a definite release of spring 4 from shaft 1 by action of releasing sleeve 6 as above described, at any time, allowing shafts 1 and 2 to rotate in either direction independently.

Assuming releasing sleeve 6 to be in a position so as to release the frictional engagement of spring 4 on shaft 1 and assuming releasing sleeve 18 to be in the position shown, upon rotation of sleeve 15 by shaft 1 in a direction opposite to the direction of winding of helical spring 16, i. e., a direction reverse to that in which shaft 1 operated through spring 4 to drive shaft 2 as above described, sleeve 15 exerts a slight frictional drag on spring 16 near end 19 causing end 19 to creep slightly in the direction of rotation of sleeve 15 producing a tightening of spring 16 on sleeve 15, due to the decrease in diameter of said spring by said creeping, with consequent increase of frictional engagement therebetween, said frictional engagement being progressively communicated throughout the entire length of spring 16 until all play and resiliency in said spring is taken up, whereupon sleeve 15 becomes in positive frictional engagement with shaft 2 through sleeve 11 and spring 16.

Upon the relative rotation of sleeve 15 in a direction opposite to that established in shaft 2, as for example in case of a tendency of shaft 2 to rotate at higher speed than shaft 1, the frictional drag on spring 16 is reversed, which action is productive of a slight rotation of spring 16 in the direction of relative rotation of sleeve 15, producing an enlargement of the diameter of spring 16 with consequent decrease of frictional engagement of said spring with said sleeve, resulting in a substantially free release of said sleeve by said spring, and allowing shaft 2 to rotate independent of shaft 1, or allowing shaft 1 to rotate in the reverse direction to that above assumed independent of shaft 2. Upon a second reversal in the direction of relative rotation of shaft 1, as for example in case of an acceleration of shaft 1 to the speed of rotation of shaft 2, the slight frictional drag of sleeve 15 on spring 16 by which said spring was held in non-gripping position will be immediately released, allowing said spring to reassume an unstrained condition; further acceleration of shaft 1 causing positive frictional engagement of spring 16 with subsequent operation of shaft 2.

Lateral movement to the right of control collar 22 will occasion a definite release of spring 16 from sleeve 15 by action of releasing sleeve 18 as above described at any time, allowing shafts 1 and 2 to rotate in either direction independently.

Control collars 9 and 22 and the releasing sleeves 6 and 18 controlled thereby may be selectively operated to produce a clutching action on shaft 2 in either direction of operation of shaft 1, or, upon both collars being set in inoperative or releasing position shaft 1 will have no operative connection with shaft 2 in either direction of rotation, or, upon both collars being set in operative position, positive operative connection is established between shafts 1 and 2 in both directions of rotation. By means of the various above operations and combinations thereof the mechanism is capable of being operated to maintain a positive operative connection between the two rotatable members during either direction of rotation thereof at the will of the operator, and to automatically release such operative connection upon relative rotation of one of said members in the opposite direction, or, both releasing sleeves being in operative position, to maintain a positive operative connection between the rotatable members in both directions; or, both releasing sleeves being in inoperative position, to maintain an inoperative condition whereupon the condition of rotation or rest of either member is unaffected by rotation of the other member in either direction.

It will be understood that sufficient rotatable play is provided between the rotatable element 2 and its releasing sleeve 6 and between rotatable element 11 and its releasing sleeve 18, so as to permit the slight relative rotation of said releasing sleeves and of the end portions of the respective springs connected thereto which is incident to contraction or enlargement of said springs for gripping or releasing the respective rotatable elements 1 and 15. For this purpose the pins 8 and 23 may be made to fit loosely within the end portions of the respective slots in which said pins are engaged when the respective springs are in position for operation, as shown in Figs. 3 and 5. It may be pointed out that said releasing sleeves are not required to determine the normal angular position of the free ends of the respective spring when the springs are in position for operation, said springs being normally held by their own strength and resiliency in the proper position of light frictional engagement with the respective rotatable elements 1 and 15, and the rotatable play between the respective releasing sleeves and the rotatable elements 2 and 11 serving to permit displacement of the free end portions of said springs in either one direction or the other to produce either tight frictional engagement of said springs with the elements 1 and 15 or release of said springs therefrom.

The above described clutch mechanism may be likened in clutching action to a clutch device of a ratchet type comprised of two concentric rings of an infinite number of ratchet teeth, clutching action being positive at any position of either rotating member. It will be understood that the form of the invention shown may be applied in connection with power transmission, as in the transmission gear of a motor vehicle, or in connection with a tool of the ratchet type. For example, in the form shown, shaft 1 may represent a handle member and shaft 2, an operated member carrying a bit, drill, or screw driver blade, and the control levers 14 and 26 will, in that case, be suitably mounted on the handle member for convenient operation.

I claim:

1. In combination, coaxially arranged driving and driven shafts each having concentrically arranged sleeves attached thereto with a helical clutch spring attached by suitable means to one shaft and in slight frictional engagement with the other shaft, and a helical clutch spring attached by suitable means to one concentric sleeve and in slight frictional engagement with the other concentric sleeve, said first-named spring cooperating with the driving shaft to transmit motion of said shaft to the driven shaft and releasing said driving shaft upon the reversal of rotation of said driving shaft in relation to the driven shaft, the second-named spring cooperating with the concentric sleeve attached to the driving shaft during the reverse direction of rotation of said shaft to transmit motion of said driving concentric sleeve to the driven concentric sleeve and thence to the driven shaft, and releasing said driven concentric sleeve upon the reversal of rotation of the driving shaft in relation to the driven shaft, substantially as described.

2. A device as set forth in claim 1 and comprising, in addition, control means for selectively operating the helical clutch springs to release same from the member with which they frictionally engage.

3. In combination, a rotatably mounted driving element, a rotatably mounted driven element axially aligned with said driving element, a helical spring rigidly connected to one of said elements in drive-communicating relation at one end and in light frictional engagement with the other of said elements at the other end thereof and wound in such direction as to provide a driving connection between said elements for rotation in one direction and to freely release such driving connection in the reverse direction, means operatively associated with said spring at the end thereof in said light frictional engagement for forcibly releasing said helical spring from said light frictional engagement with said other element, and another helical spring rigidly connected to one of said elements in drive-communicating relation at one end and in light frictional engagement with the other of said elements at the other end and wound in the opposite direction to said first named spring to provide a driving connection between said elements upon rotation in the opposite direction to said first named direction and to freely release such driving connection upon rotation in said first named direction.

4. In combination, a rotatably mounted driving element, a rotatably mounted driven element axially aligned with said driving element, two reversely operating helical spring means cooperating with said elements, each of said helical spring means being rigidly connected to one of said elements in drive-communicating relation at one end thereof and in light frictional engagement with the other of said elements at the other end thereof, one of said spring means operating to provide a driving connection from the driving element to the driven element in one direction of rotation and to release such connection upon relative rotation of the driving element in the reverse direction, and the other of said helical spring means operating to provide a driving connection from said driving element to said driven element upon rotation of the driving element in the direction opposite to said first named direction and to release such connection upon relative rotation of said driving element in the reverse direction to said last named driving direction, and means operatively associated with one of said spring means at the end thereof in said light frictional engagement for forcibly releasing said one spring means from its frictional engagement with the element normally engaged thereby.

5. In combination, a driving element, a driven element and two reversely operating helical spring means cooperating with said elements to provide for driving the driven element in either direction and to automatically prevent the driven element becoming the driving element upon reversal of relative motion of said elements in either direction of rotation, each helical spring means having one end positively connected to one of said elements in drive communicating relation and having its other end in light frictional engagement with the other of said elements, and means operatively associated with each of said spring means at said other end for forcibly releasing either of said helical spring means from such light frictional engagement.

FRANKLIN C. FISHER.